(No Model.)

J. GREEN.
OPERA GLASSES.

No. 450,409. Patented Apr. 14, 1891.

Witnesses:
N. G. Thompson
A. C. Nowcott

Inventor:—
James Green
by Richards & Co.
attys.

UNITED STATES PATENT OFFICE.

JAMES GREEN, OF BURWOOD, NEAR SYDNEY, NEW SOUTH WALES.

OPERA-GLASSES.

SPECIFICATION forming part of Letters Patent No. 450,409, dated April 14, 1891.

Application filed May 13, 1890. Serial No. 351,702. (No model.)

*To all whom it may concern:*

Be it known that I, JAMES GREEN, jeweler, a subject of the Queen of Great Britain, residing at Burwood, near Sydney, in the Colony of New South Wales, have invented new and useful Improvements in Lorgnettes and Such Like Instruments, of which the following is a specification.

This invention relates to lorgnettes or opera-glasses and such like instruments for viewing distant objects, and it has been devised specially to produce a lorgnette or opera-glass by which without changing position persons and objects behind or to the side of the user may be observed.

These improvements in lorgnettes and such like instruments consist, first, in the combination and arrangement, with and in front of either object-glasses, of a lorgnette or binocle, or with and in front of the object-glass of a telescope of an adjustable mirror in which the user of the binocle or telescope may observe reflections of objects behind and around him.

These improvements consist, secondly, in the peculiar method of adjusting the position of the mirror relative to the central line of the instrument and of adjusting the angle or plane of the mirror relative to the plane of the object-glass; and they further consist in the particular combinations and arrangements of mechanical parts hereinafter described and claimed.

But in order that this invention may be clearly understood, I will now describe in detail, with the assistance of drawings, how I apply my improvements to lorgnettes or opera-glasses, and from such description it will readily be seen by those skilled in the art to which this invention pertains how the improvements may be applied, if required, to other binocles or to telescopes.

Figure 1:
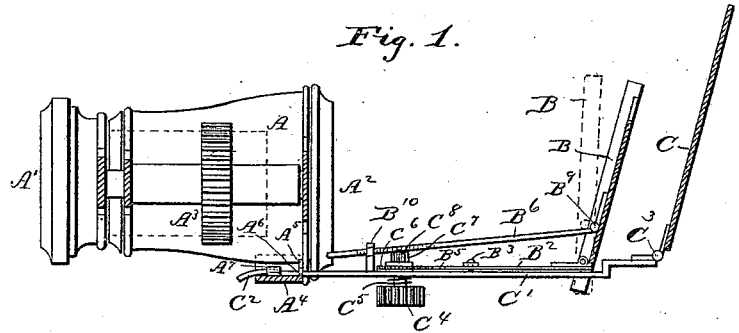
Figure 2:
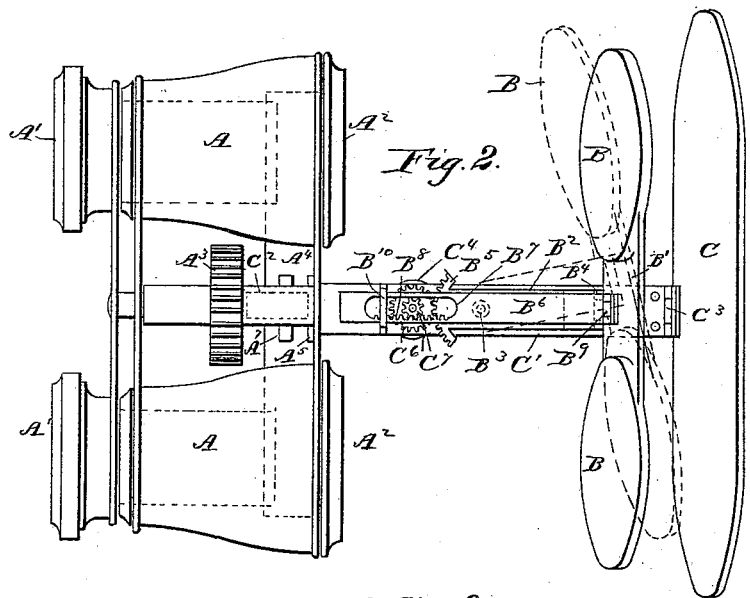
Figure 3:
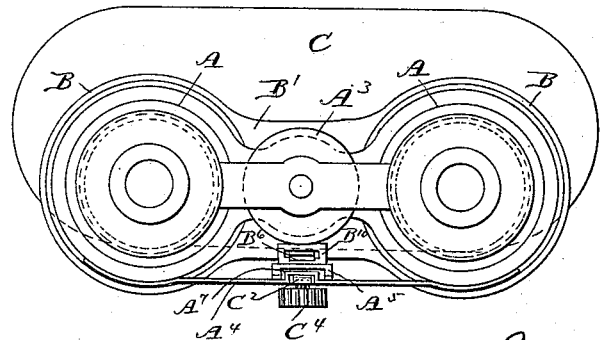

In the drawings herewith, Figure 1 is a sectional elevation of a lorgnette or opera-glass having my improvements attached. Fig. 2 is a plan, and Fig. 3 an end view, of the same, respectively.

A A are telescopic opera-glasses.

B B are mirrors or reflectors.

C is a blank or shutter.

$A'$ $A'$ are eyeglasses; $A^2$ $A^2$, object-glasses; $A^3$, focus-screw; $A^4$, plate or carrier; $A^5$, angle-plate; $A^6$, slot therein; $A^7$, holding-down plate.

$B'$ is a carrier-plate; $B^2$, radial plate pivoted at $B^3$; $B^4$, hinge; $B^5$, sector-wheel; $B^6$, stay; $B^7$, slot with teeth $B^8$; $B^9$, hinge; $B^{10}$, guide or staple.

$C'$ is a frame; $C^2$, attachment end; $C^3$, hinge; $C^4$, thumb-screw; $C^5$, spring; $C^6$, toothed wheel; $C^7$, toothed pinion; $C^8$, pin.

When in use the mirrors or reflectors B and connections are carried by plate or carrier $A^4$, with the attachment end $C^2$ of frame $C'$ passed through the slot $A^6$ in the angle-plate $A^5$ and then under the holding-down plate $A^7$. The frame $C'$ and the mirrors or reflectors B are thus held securely in position behind the object-glasses $A^2$, and an observer is enabled to sit with his back to the objects he wishes to view and see them reflected in the mirrors or reflectors. The focus of the binocle is adjusted in the usual way by manipulation of the focus-screw $A^3$. The adjustment of the position of the mirrors with the central line of the instrument or the radial position is effected by turning thumb-screw $C^4$, thereby causing the toothed wheel $C^6$ to turn the sector-wheel $B^5$ and move the plate $B^2$ round on pivot $B^3$ until the reflectors have attained the required position to include the desired objects, Fig. 2. The angle or plane of the mirrors relative to the plane of the object-glasses is adjusted by pressing the thumb-screw $C^4$ upward to compress spring $C^5$ and lift the toothed wheel $C^6$ out of gear with the sector-wheel $B^5$, causing pinion $C^7$ to enter slot $B^7$ and its teeth to gear with the teeth $B^8$ on said slot. Now when the thumb-screw is turned the pinion $C^7$ in teeth $B^8$ causes stay $B^6$ to move backward or forward with the bearer-plate to which it is attached, and so increase or diminish the angular set of the mirrors or reflectors, Fig. 1. When not in actual use the mirrors or reflectors and connection are separated from the lorgnette by withdrawing attachment end $C^2$ from slot $A^6$ and plate $A^7$ and disengaging stay $B^6$ from guide or staple $B^{10}$, folding the mirrors on hinge $B^4$ and the blank or shutter C on hinge $C^3$, when the whole is in a flat position and may be snugly placed in a compartment made in the ordinary lorgnette-case.

It is to be understood that I do not confine myself to the precise details herein described and shown, nor to any particular method of carrying my invention into practice, so long as the nature of my invention be retained.

Having now particularly described and explained the nature of my said invention and in what manner the same is to be performed, I declare that what I claim is—

1. The combination, with a lorgnette or other telescope, of a reflector arranged in front of the object glass or glasses of the telescope, means, substantially such as described, for adjusting the reflector angularly relative to the central line of the instrument, and means, substantially such as described, for adjusting the reflector relative to the horizontal plane of the object being viewed, substantially as set forth.

2. The combination, with a lorgnette or binocle, of a pair of mirrors or reflectors, such as B, a hinged bearer, such as B', a stay, such as B$^6$, passing through a staple, such as B$^{10}$, and a toothed pinion, such as C$^7$, adapted to gear with and give motion to such stay, substantially as herein described and explained, and as illustrated in the drawings.

3. The combination, with a lorgnette or binocle, of a pair of mirors or reflectors, such as B, a pivoted carrier, such as B', a toothed sector-wheel, such as B$^5$, on such carrier, and a toothed wheel, such as C$^6$, substantially as herein described and explained, and as illustrated in the drawings.

4. The combination, with an opera-glass or similar telescope, of a pair of reflectors supported upon a carrier arranged in front of the object-glasses of the telescope, and a shutter or blank in front of the reflectors, the reflectors and shutter being removably connected with the telescope, substantially as set forth.

JAMES GREEN.

Witnesses:
FRED WALSH,
   *F. M. and P. A.*
THOMAS KING.